(12) United States Patent
Viertl

(10) Patent No.: US 7,805,998 B2
(45) Date of Patent: Oct. 5, 2010

(54) APPARATUS AND METHOD FOR INSPECTION OF TURBINE VALVE SEATS

(75) Inventor: John Ruediger Mader Viertl, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 546 days.

(21) Appl. No.: 11/755,830

(22) Filed: May 31, 2007

(65) Prior Publication Data

US 2008/0295901 A1     Dec. 4, 2008

(51) Int. Cl.
*G01N 29/265* (2006.01)
*G01N 29/06* (2006.01)

(52) U.S. Cl. .............................. 73/623; 73/622; 376/249

(58) Field of Classification Search .................... 73/622, 73/623; 376/249
See application file for complete search history.

(56) References Cited

U.S. PATENT DOCUMENTS

| | | | | |
|---|---|---|---|---|
| 3,584,504 A | * | 6/1971 | Proctor et al. | ................. 73/640 |
| 5,046,364 A | * | 9/1991 | Stasuk et al. | ................... 73/623 |
| 5,189,915 A | * | 3/1993 | Reinhart et al. | ............... 73/623 |
| 5,420,898 A | * | 5/1995 | Steagall | ....................... 376/252 |
| 5,460,045 A | * | 10/1995 | Clark et al. | .................... 73/622 |
| 6,886,407 B1 | * | 5/2005 | Fredenberg | .................. 73/622 |
| 2006/0055401 A1 | * | 3/2006 | Kuljis et al. | ................. 324/240 |
| 2007/0096728 A1 | | 5/2007 | Viertl | |

\* cited by examiner

*Primary Examiner*—Hezron Williams
*Assistant Examiner*—Rose M Miller
(74) *Attorney, Agent, or Firm*—Cantor Colburn LLP

(57) ABSTRACT

An apparatus and method for remote frequency-based inspection of a valve seat includes inserting a frequency-based inspection tool into an inspection position over the valve seat and contacting the one or more supports to the inner surface of the valve seat. An input signal is transmitted at a desired frequency through the valve seat to a joint between the valve seat and a valve shaft via the one or more transducers. The shaft is rotated to remotely rotate the fixture, thereby allowing an inspection of an entire perimeter of the joint. An output signal is received and is evaluated to determine if an anomaly is present in the joint.

20 Claims, 4 Drawing Sheets

APPARATUS AND METHOD FOR INSPECTION OF TURBINE VALVE SEATS

BACKGROUND

The subject invention relates to steam turbines. More particularly, the invention relates to an apparatus and method for inspection of steam turbine valve seats.

Steam turbine valve seats are subject to periodic inspection for wear or damage that, if not corrected, would eventually cause significant damage to the steam turbine. In many cases, the valve seat is formed from metal, for example a wear resistant metal such as satellite, and affixed to a steel valve opening. A bond joint between the valve seat and valve opening is inspected to ensure the continued integrity of the joint. The standard inspection method for this joint utilizes penetrants. The penetrant inspection can reveal cracks or other abnormalities in the joint, but only in visible areas, for example an edge, but not in areas of the joint which are not visible. Additionally, because the valve seats are relatively inaccessible for inspection when installed in the steam turbine, the valve seats are inspected in-place in the steam turbine. There is, however, considerable risk of not detecting damage to the valve seat, valve body, or other components because of poor access and visibility of the junction between the stellite inlay and the surrounding steel of the valve seat. Further, penetrant inspection only permits an inspection of the exposed junction between the inlay material and the base material of the valve seat. Disassembly of large valve seats from valve bodies is difficult, expensive and not performed unless the seat is to be replaced with a new seat.

Frequency-based inspection, for example, ultrasonic inspection, is another possible method of inspection for valve seats. It permits the inspection of the interface between the stellite inlay and the steel of the valve seat. So it extends the inspection region to include the region that the penetrant examination cannot test. In frequency-based inspection, a probe containing one or more transducers connected to a diagnostic machine is passed over the object being tested. The transducer sends pulsewaves into the surface of the object, and an output signal is received by a receiver. The screen on the diagnostic machine will show these results in the form of amplitude and pulse readings, as well as the time it takes for the waves to reach the receiver. This data is evaluated to determine if an anomoly is present.

Frequency based inspection has not been utilized to inspect installed valve seats because of lack of access and the difficulty of accessing the stellite inlay from the end of a large valve, and/or line of sight visibility to the valve seat surface when installed. Without physical access for large valves and/or line of sight visibility, there may be noise signals present in the inspection data generated by, for example, variable lift-off of the probe from the valve seat surface and/or wobble of the probe on the valve seat surface. These noise signals may prevent accurate inspection results. Removing the valve seats for inspection presents the same risks of damage and increase in inspection time as noted above for penetrant inspection.

BRIEF DESCRIPTION OF THE INVENTION

A remote frequency-based inspection tool for a valve seat comprises a fixture receivable in a valve seat, and a shaft fixed to the fixture allowing remote manipulation of the fixture. The fixture includes one or more transducers contactable with an inner surface of the valve seat when the fixture is in an inspection position and one or more supports contactable with the inner surface of the valve seat when the fixture is in an inspection position.

A method of remote frequency-based inspection of a valve seat comprises inserting the inspection tool into an inspection position over the valve seat and contacting the one or more supports to the inner surface of the valve seat. An input signal is transmitted at a desired frequency through the valve seat to a joint between the valve seat and a valve shaft via the one or more transducers. The shaft is rotated to remotely rotate the fixture, thereby allowing an inspection of an entire perimeter of the joint. An output signal is received and is evaluated to determine if an anomaly is present in the joint.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
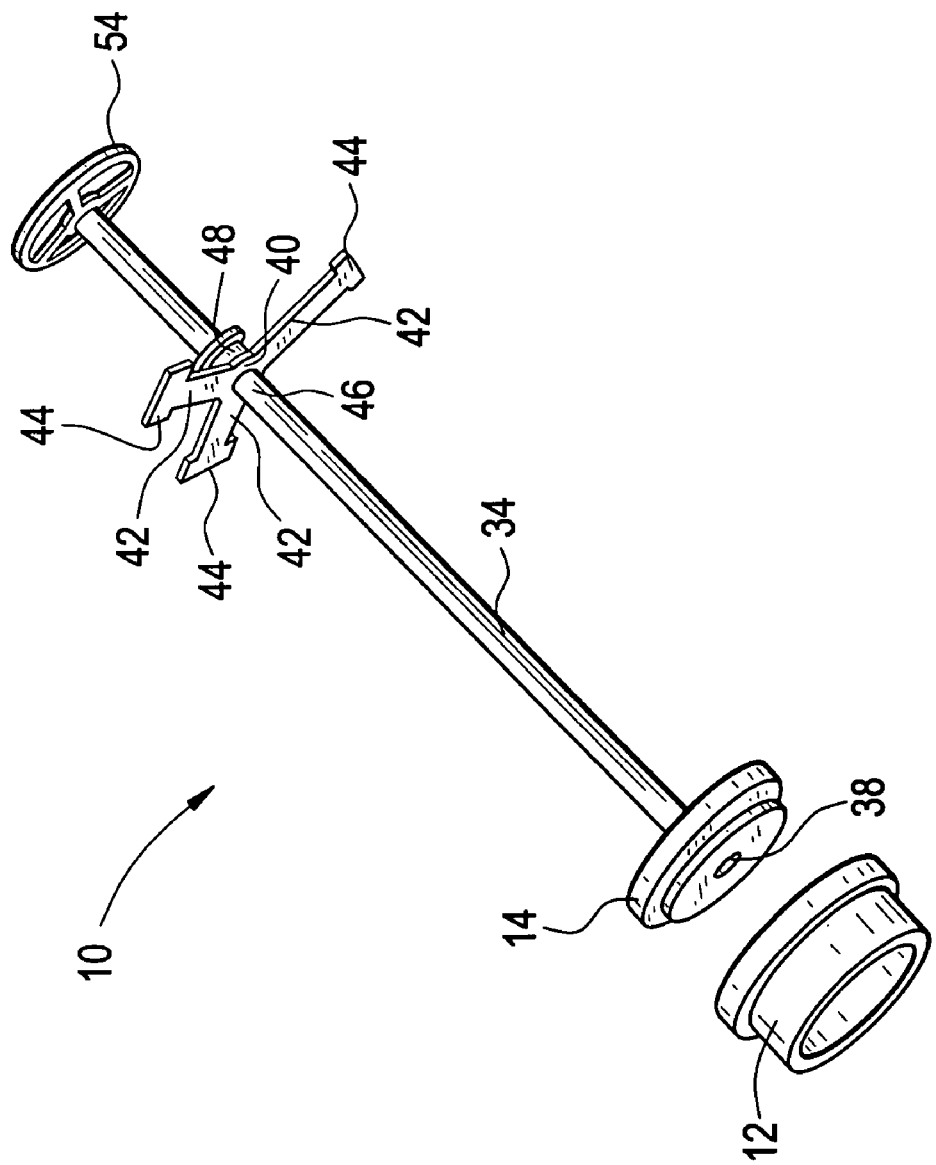
FIG. 1 is a perspective view of an embodiment of a frequency-based inspection tool for a valve seat.
Figure 2:
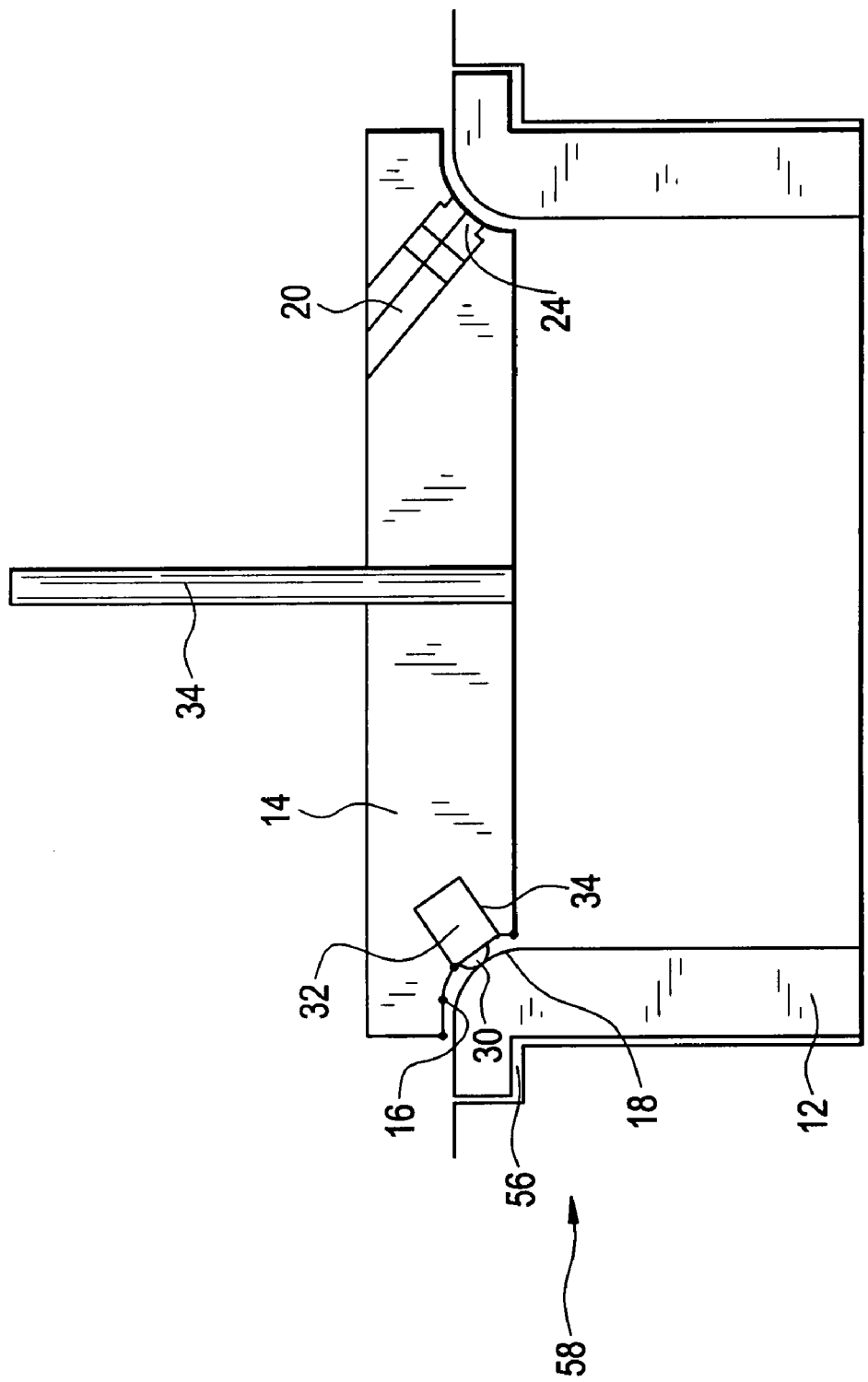
FIG. 2 is a section view of the fixture portion of the tool of FIG. 1.
Figure 3:
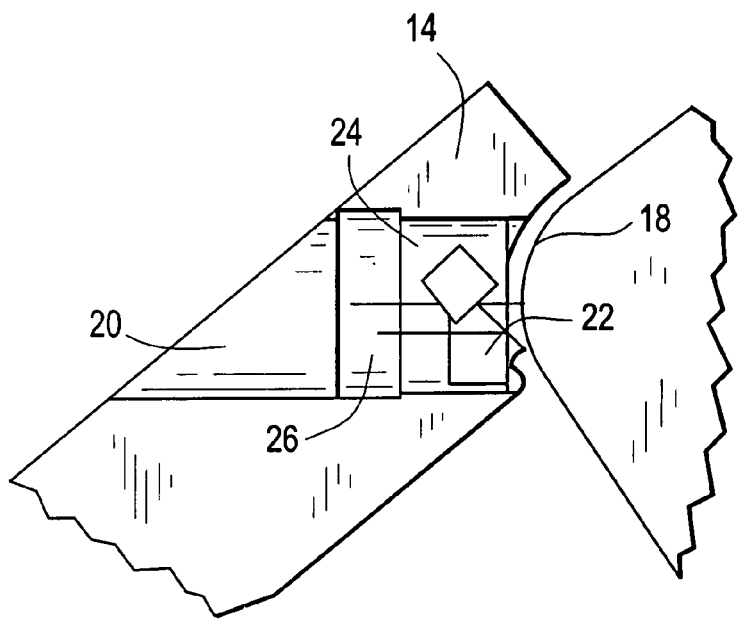
FIG. 3 is a detail view of an embodiment of a fixture illustrating an exemplary transducer configuration.

A device 10 for frequency-based inspection of a valve seat 12 in, for example, a steam turbine, is shown in FIG. 1. In one embodiment, the device 10 includes a fixture 14 configured to be receptive in the valve seat 12. As shown in FIG. 2, the fixture 14 includes an outer surface 16 that substantially conforms to an inner surface 18 of the valve seat 12. The shape of the fixture 14 may be configured to conform to many types of valve seats 12 including, for example, a stop valve seat or control valve seat. The fixture 14 includes one or more ports 20 that are receivable of one or more transducers 22. As shown in FIG. 3, in one embodiment, the transducers 22 are disposed in a transducer carrier 24. The transducers 22 are disposed within the fixture 14 such that when the fixture is positioned at the valve seat 12 to be inspected, the transducers 22 are substantially facing the surface 18. In some embodiments, the transducers 22 may be spring loaded, allowing the transducers 22 to project toward surface 18, and stops 26 may additionally be included in the ports 20 to limit travel of the transducers 22. The embodiment shown in FIG. 4 includes 3 transducers ports 20 arranged substantially equally spaced around the perimeter of the fixture 14. This configuration provides for an accurate and repeatable inspection of the valve seat 12. It is to be appreciated, however, that other quantities and arrangements of transducer ports 20 and transducers 22 are contemplated within the scope of this invention. In some embodiments, the transducers 22 operate at frequencies greater than 50 kilohertz, or ultrasonic frequencies. Further, in one embodiment, the transducers 22 operate at a frequency of about 5 megahertz. Utilizing 5 megahertz transducers 22 provides the resolution and sensitivity necessary to reveal small cracks and/or imperfections in the valve seat 12. It is to be appreciated, however, that other transducer 22 frequencies are contemplated within the scope of this invention.

Figure 4:
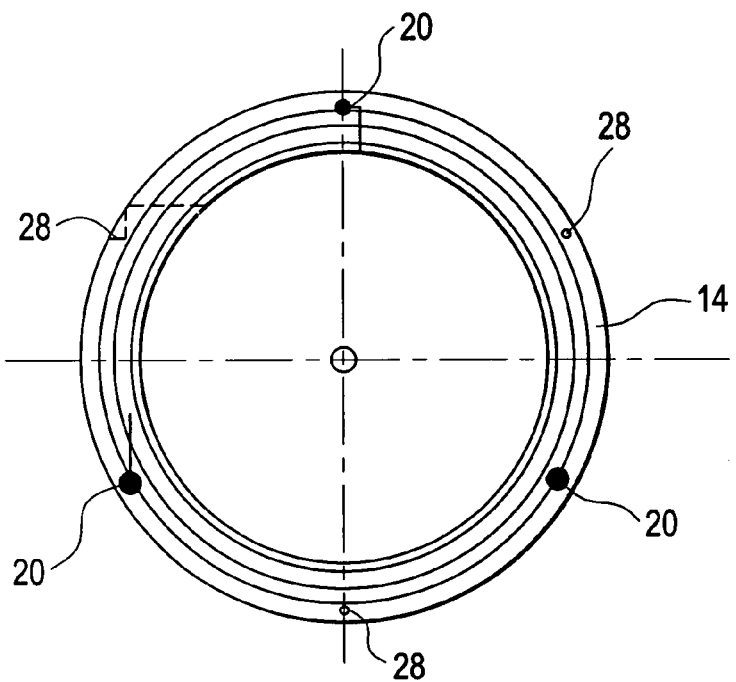
FIG. 4 is a plan view of an embodiment of a fixture.

As shown in FIG. 4, the fixture 14 includes one or more supports 28 to support the fixture 14 in the valve seat 12. Supporting the fixture 14 in the valve seat 12 helps ensure accuracy of the inspection by preventing unwanted movement of the fixture 14 during the inspection process, thus minimizing noise signals. In one embodiment, the supports 28 are roller bearings 30, but other means may be utilized as supports 28. Referring now to FIG. 2, each roller bearing 30 is held by a bearing support 32, which is disposed in a bearing hole 34 in the fixture 14. The roller bearings 30 are located equally spaced around the perimeter of the fixture 14, and are located substantially equidistant between transducer ports 20. In a fixture 14 shown in FIG. 4 where three transducers ports 20 are utilized, three supports 28 are employed, but other quantities of supports 28 are contemplated within the scope of this invention. Referring again to FIG. 2, the roller bearings 30 are configured and disposed such that when the fixture 14 is moved into an inspection position at the valve seat 12, the roller bearings 30 contact surface 18 of the valve seat 12, thus providing support for the fixture 14 while allowing the fixture 14 to be easily rotated for scanning inspection of the valve seat 12.

Figure 5:
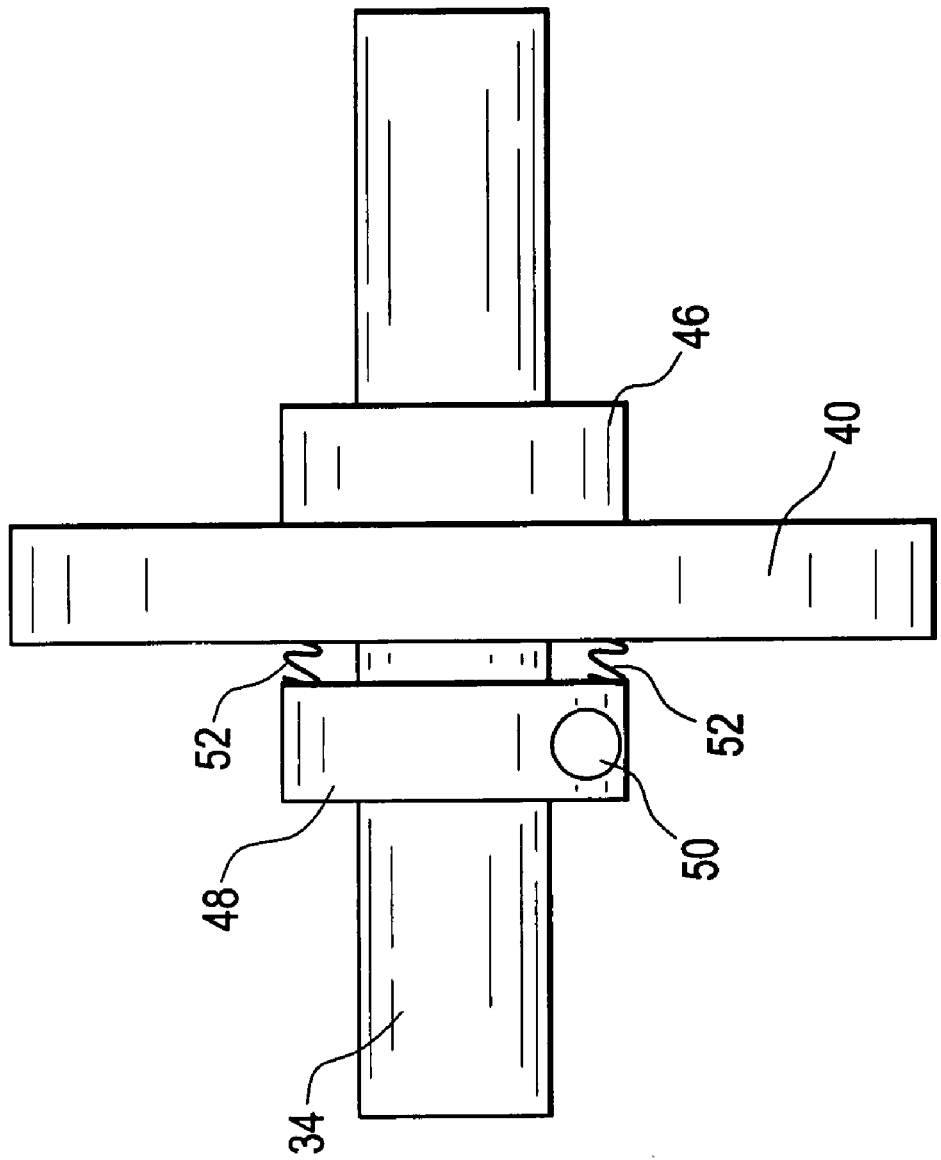
FIG. 5 is a partial plan view of an embodiment of a shaft and a stabilizer.

Referring now to FIG. 1, the fixture 14 is fixed to a shaft 34, such that the shaft 34 extends from the fixture 14 substantially perpendicular to a measurement face 36. For example, the shaft 34 may be inserted into and retained in a shaft hole 38 disposed in the fixture 14. In some embodiments, one or more stabilizers 40 may be disposed along the shaft 34. The stabilizers 40 include one or more support arms 42 extending radially outward to support the shaft 34 and prevent unwanted movement of the shaft 34 and the attached fixture 14 during inspection of the valve seat 12. In some embodiments, the support arms 42 include a strongly magnetic plate 44 which, when contacted with the steam turbine structure, further stabilizes the shaft 34 and fixture 14 by further preventing unintended movement of the shaft 34 and fixture 14. This may be especially useful in inspecting valve seats 12 that lie substantially in a vertical plane such that the shaft 34 is substantially horizontal during the inspection, such as a stop valve seat, for example. As illustrated in FIG. 5, in some embodiments, a retention bushing 46 and a clamp ring 48 are employed to retain the stabilizer 40 in an axial position on the shaft 34. The retention bushing 46 is installed and retained on the shaft 34 by, for example, press fit. The stabilizer 40 is installed on the shaft 34 and rests on the retention bushing 46. To retain the stabilizer 40 in its desired position on the shaft 34, the clamp ring 48 in installed on the shaft over the stabilizer 40. A clamp ring screw 50 is the tightened, thus retaining the clamp ring 48 on the shaft 34. One or more springs 52 may be disposed between the clamp ring 48 and the stabilizer 40, and/or between the stabilizer 40 and the retention bushing 46 to allow some flexibility in the axial position of the stabilizer 40 on the shaft 34.

Referring again to FIG. 1, some embodiments of the inspection device 10 may include a scanning control ring 54. The scanning control ring 54 is fixed to the shaft 34 at an end opposite to the fixture 14. The scanning control ring 54 allows an inspection operator to control rotation of the fixture 14 to perform inspection of the valve seat 12.

To perform an inspection of a valve seat 12, the device 10 is inserted into the steam turbine, and the fixture 14 is positioned over the valve seat 12 to be inspected. The supports 28 contact surface 18 on the valve seat 12, and the transducers 22 are positioned over surface 18. The supports 28 and the stabilizer 40 prevent undesired motion or lift-off of the fixture 14 relative to the valve seat 12, preventing noise signals from the transducers 22 thus resulting in a more accurate inspection of the valve seat 12. Referring now to FIG. 2, the transducers 22 transmit input signals through the valve seat 12 and a signal is received by a receiver. In the embodiment shown in FIG. 2, the transducers 22 are configured such that the output signal is reflected to the transducer 22 if an anomaly is encountered, indicating a flaw in a joint 56 between the valve seat 12 and a valve shaft 58. The inspection operator rotates the fixture 14 by turning the scanning control ring 54 to inspect the entire surface 18 of the valve seat 12.

The device 10 can be either manually or automatically driven. With encoders attached, a transducer 22 position along surface 18 can be determined and used with the received signals to provide a computer display of indications or anomalies in the valve seat 12 and the joint 56. This permits the presentation of the signals as an image or table for evaluation of the quality of the joint 56 and also of the valve seat 12. Various levels of data capture, recording, analysis and evaluation from using either written records or proceeding to a fully computerized inspection system are possible. The preferred implementation is to use a skilled operator with a manual inspection.

While embodiments of the invention have been described above, it will be understood that those skilled in the art, both now and in the future, may make various improvements and enhancements which fall within the scope of the claims which follow. These claims should be construed to maintain the proper protection for the invention first described.

The invention claimed is:

1. A remote ultrasonic inspection tool for a valve seat comprising:
   a fixture receivable in a valve seat, the fixture including:
      one or more ultrasonic transducers contactable with an inner surface of the valve seat when the fixture is in an inspection position; and
      one or more supports at least partially receivable in an interior of the valve seat and contactable with the inner surface of the valve seat when the fixture is in an inspection position; and
      a shaft fixed to the fixture allowing remote manipulation of the fixture.

2. The inspection tool of claim 1 wherein at least one of the one or more ultrasonic transducers is extendable toward the valve seat.

3. The inspection tool of claim 2 wherein the fixture includes a stop to limit the extension of each ultrasonic transducer.

4. The inspection tool of claim 1 wherein the one or more ultrasonic transducers comprise three ultrasonic transducers.

5. The inspection tool of claim 1 wherein the one or more ultrasonic transducers utilize a frequency greater than 50 kilohertz.

6. The inspection tool of claim 5 wherein the one or more ultrasonic transducers utilize a frequency of substantially 5 megahertz.

7. The inspection tool of claim 1 wherein the one or more supports comprise roller bearings.

8. The inspection tool of claim 1 wherein each support of the one or more supports are substantially equidistant between ultrasonic transducers along a perimeter of the fixture.

9. The inspection tool of claim 1 further comprising a stabilizer including a plurality of support arms, the stabilizer fixed to the shaft to prevent unintended movement of the fixture relative to the valve seat during an inspection of the valve seat.

10. The inspection tool of claim 9 wherein each support arm includes a strong magnetic plate which, when the tool is moved into an inspection position, prevents lift off of the fixture from the valve seat.

11. The inspection tool of claim 9 wherein the stabilizer is fixed in place between a bushing and a clamp ring fixed to the shaft, the bushing and clamp ring applying sufficient force to the stabilizer to fix its position.

12. The inspection tool of claim 1 further comprising a scanning control ring disposed at an opposite end of the shaft from the fixture, the scanning control ring allowing for remote control of rotation of the fixture during an inspection.

13. A method of remote ultrasonic inspection of a valve seat comprising:
   inserting a frequency-based inspection tool into an inspection position over the valve seat, the inspection tool including:
   a fixture receivable in a valve seat, the fixture including:
   one or more ultrasonic transducers contactable with an inner surface of the valve seat when the fixture is in an inspection position; and
   one or more supports at least partially receivable in an interior of the valve seat and contactable with the inner surface of the valve seat when the fixture is in an inspection position; and
   a shaft fixed to the fixture allowing remote manipulation of the fixture;
   contacting the one or more supports to the inner surface of the valve seat;
   transmitting an input signal at a desired frequency through the valve seat to a joint between the valve seat and a valve shaft via the one or more ultrasonic transducers;
   rotating the shaft to remotely rotate the fixture, thereby allowing an inspection of an entire perimeter of the joint;
   receiving an output signal; and
   evaluating the output signal to determine if an anomaly is present in the joint.

14. The method of claim 13 wherein at least one ultrasonic transducer of the one or more ultrasonic transducers is extendable toward the valve seat.

15. The method of claim 13 wherein the one or more ultrasonic transducers utilize a frequency greater than 50 kilohertz.

16. The method of claim 15 wherein the one or more ultrasonic transducers utilize a frequency of substantially 5 megahertz.

17. The method of claim 13 wherein the output signal is received by the one or more ultrasonic transducers.

18. The method of claim 13 wherein the one or more supports comprise roller bearings.

19. The method of claim 13 wherein the fixture further comprises a stabilizer including a plurality of support arms, the stabilizer fixed to the shaft to prevent unintended movement of the fixture relative to the valve seat during an inspection of the valve seat.

20. The method of claim 13 wherein the shaft is rotated by rotating a scanning control ring disposed at an opposite end of the shaft from the fixture.

* * * * *